Patented Feb. 7, 1950

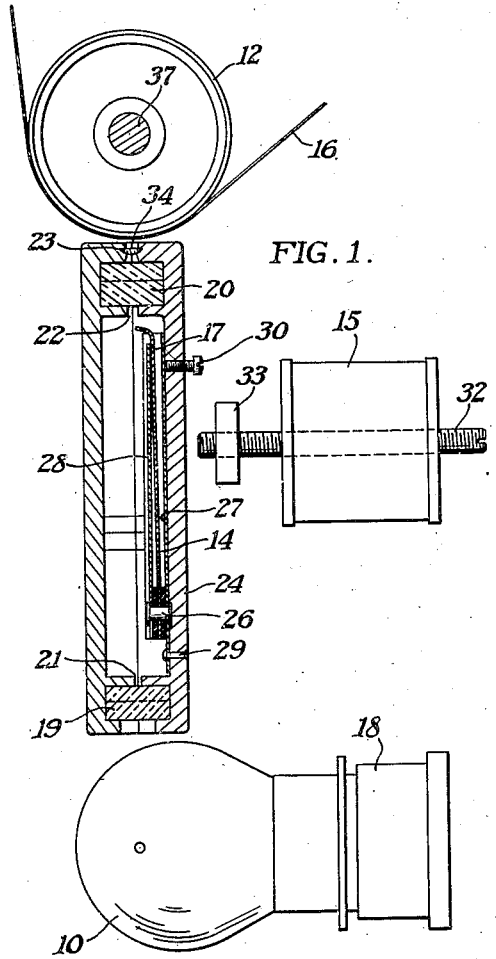
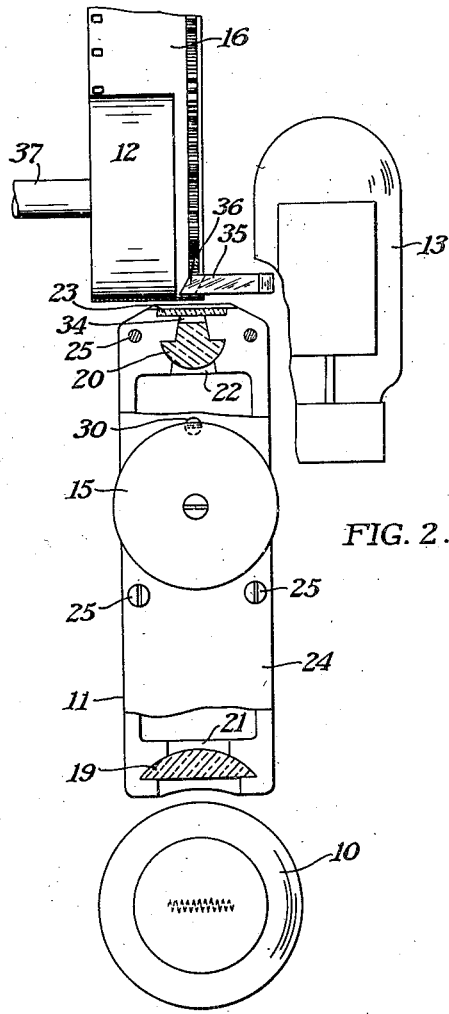
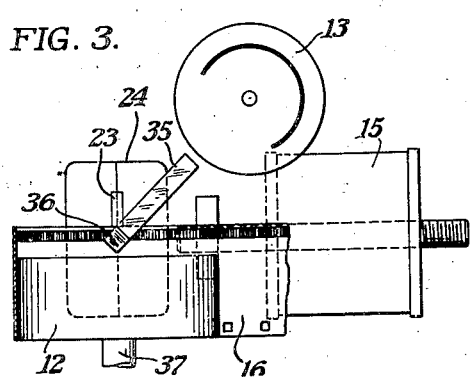
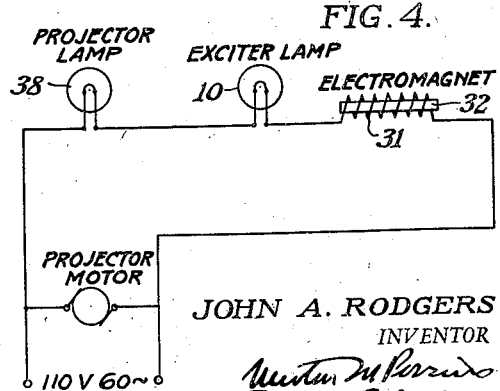

2,496,959

UNITED STATES PATENT OFFICE 2,496,959

PHOTOGRAPHIC SOUND TRACK SCANNING APPARATUS WITH LIGHT FLICKER COMPENSATION

John A. Rodgers, Rochester, N. Y., assignor to Eastman Kodak Company, Rochester, N. Y., a corporation of New Jersey Application January 8, 1947, Serial No. 720,721

12 Claims. (Cl. 179—100.3)

The present invention relates to a device operating upon alternating current and adapted to project a beam of light of substantially constant light flux. It more specifically relates to a sound motion picture scanning apparatus and still more particularly to an improved sound motion picture scanning apparatus which is adapted to eliminate or substantially reduce speaker hum caused by the cyclic variations in filament brightness of the exciter lamp which result from the use of alternating current to energize the lamp.

In sound motion picture projectors means are provided to translate the light and dark areas of the sound track into electrical impulses to operate a loud speaker through an amplifier. Usually, this is accomplished by focusing a thin band or ribbon of light from an exciter lamp upon the sound track of a film moving at a uniform velocity. The opacity of the sound track determines the light flux which passes through the film and impinges upon the phototube which is positioned beyond the film. The electrical impulses of the phototube, so modulated by the sound track, control the audio amplifier and speaker. In such a system the exciter lamp must provide a considerable light output to overcome the operating inefficiencies of the optics, phototube, etc. and consequently requires a substantial supply of electrical energy. This is most readily available from the 60-cycle alternating current supply used to operate the projector, the amplifier, etc. This energy, however, is unfortunately of a pulsating nature and, if used directly without rectification and filtration, causes cyclic variations of filament brightness of the exciter lamp. This pulsation of the light flux affects the phototube, usually quite strongly, with the result that the speaker hums, much as though it were connected directly to an alternating current power line. Since the current in the exciter lamp reaches maximum and minimum values twice during an alternating current cycle, the speaker hum has twice the line frequency. This hum is extremely objectionable to the listener and in addition produces distortion by modulating all the sound track frequencies.

There are several known methods by which this hum may be reduced or eliminated. For example, the exciter lamp may be supplied by direct current from a battery. Since this is seldom convenient, alternating current may be rectified and filtered for the purpose but this necessitates relatively bulky, expensive apparatus to supply the fairly heavy current requirements of the filament. An alternative is to employ a power oscillator operating at supersonic frequency; but this, on account of physical limitations affecting the "power pack" of the machine, requires the use of low-wattage exciter lamps in amateur equipment.

An effective yet simple means for eliminating or substantially reducing speaker hum, caused by the cyclic variations in filament brightness occasioned by the use of alternating current, is described by Miller R. Hutchison, Jr., in his application for U. S. Letters Patent, Serial No. 704,399, filed October 19, 1946. The means disclosed therein include a reed which projects partially into the light beam scanning the sound track and which is vibrated by an electromagnet connected in parallel with the exciter lamp in the alternating current circuit. The vibrations of the reed are so synchronized in respect to amplitude and phase with the cyclic variations in filament brightness that the reed moves into the light beam intercepting a greater amount of light flux, as the light intensity of the filament is increased, and is withdrawn from the beam intercepting less flux, as the light intensity is decreased. By a careful control of the amplitude and phase of reed displacement the total light flux impinging upon the sound track can be made to remain substantially constant. While means are provided to permit the adjustment of both the amplitude and phase of the reed vibration, it has been found that the device disclosed in the above-identified application is extremely sensitive to changes in line voltage. Such variations in voltage tend to unbalance the system causing the return of a certain amount of speaker hum. The present invention, therefore, is directed to an improvement in the device disclosed by Hutchison in his application for U. S. Letters Patent, Serial No. 704,399, wherein the system is less sensitive to variations in line voltage and which has certain other advantages thereover as will be apparent from the following description.

It is, therefore, an object of the present invention to provide an improved device which will project a beam of light of substantially constant light flux despite the cyclic variations in filament brightness of the lamp which are caused by the use of alternating current to energize the lamp.

It is a further object of the present invention to provide an improved sound motion picture scanning apparatus in which speaker hum, caused by the cyclic variations in filament brightness of the exciter lamp occasioned by the use of alternating current to energize the lamp, is eliminated or substantially reduced.

It is a still further object of this invention to provide an improved sound film scanning device in which a reed is caused to vibrate in such manner as to partially occlude the light flux emitted by an exciter lamp and directed upon the sound track of the film, the vibrations of the reed being synchronized with the cyclic variations in filament brightness of the exciter lamp so that the light flux impinging upon the sound track remains substantially constant.

It is a still further object of this invention to provide an improved device of the character described in which various adjustments may be readily effected in regard to the amplitude and phase of reed displacement whereby the light flux impinging upon the sound track remains substantially constant despite the cyclic variations in filament brightness of the exciter lamp.

It is a still further object of this invention to provide an improved device of the character described which is relatively insensitive to small variations in line voltage which might otherwise tend to unbalance the system and result in speaker hum.

It is a still further object of this invention to provide an improved sound motion picture scanning apparatus which is compact, simple in construction, relatively inexpensive and fool-proof in operation.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. For the purposes of illustration the present invention is described as embodied in a sound motion picture scanning apparatus. It is apparent, however, that the invention is applicable to other devices which operate on alternating current and in which it is desired to project a beam of light of substantially constant light flux. I, therefore, do not wish to be limited to the exact details shown and described as the preferred form only has been shown by way of illustration.

In the drawing:

Fig. 1 is a front elevational view of a sound film scanning apparatus, partly in section, embodying the present invention;

Fig. 2 is a side elevational view, also partly in section, of the same embodiment;

Fig. 3 is a plan view of the same embodiment; and

Fig. 4 is a wiring diagram illustrating the manner in which the elements of the film scanning apparatus are connected into the projection lamp and motor circuit.

The sound film scanning apparatus illustrated in Figs. 1 to 3, comprises the exciter lamp 10, the optical system 11, the sound stabilizing and scanning drum 12, the phototube 13, the vibratory mechanism 14 and the electromagnet 15. The optical system 11 is adapted to project a beam of light from the exciter lamp 10 and to focus a thin band of light upon the sound track of the film 16 which is guided through the beam by the drum 12. The light flux in this thin band modified by its passage through the sound track is caused to impinge upon the phototube 13 resulting in the latter emitting electrical impulses, modulated by the sound track. These impulses in turn control the audio amplifier and speaker (not shown). Compensation for the cyclic variations in filament brightness of the lamp 10 which result from the use of alternating current is effected by the use of the vibratory mechanism 14 actuated by the electromagnet 15. The former includes a reed 17 which is caused to vibrate and to project partially into the light beam traversing the optical system 11 to intercept varying amounts of light flux. The amplitude and phase of reed displacement is so controlled that the reed mechanically valves the light flux as the filament brightness varies whereby the light flux impinging upon the sound track remains substantially constant.

The exciter lamp 10 is mounted in the lamp socket 18 which is fixed relative to the optical system 11. It should be understood that while the various elements, such as the lamp socket, the optical system, the scanning drum, the phototube and the electromagnet, are illustrated in the drawing without any apparent connecting brackets or supports, these elements are in fact connected by conventional means to the sound projector. The socket 18 secures the lamp 10 relative to the optical system 11 in such fashion that the lamp filament is correctly aligned with the optics. The optical system 11 includes two convergent lenses 19 and 20, preferably cylindrical, between which is interposed the reed 17, the vibrations of which cause it to intercept varying amounts of light flux. Fixed apertures 21 and 22 are located adjacent the lenses 19 and 20, respectively. Beyond the lens 20 is positioned a third lens 23, also cylindrical, its geometrical axis being parallel to the filament of the lamp 10 and at right angles to the axes of the cylindrical lenses 19 and 20. The lens 23 focuses that portion of the light flux, which has traversed the lenses 19 and 20 without being intercepted by the reed 17, as a narrow band of light upon the sound track of the film. The above elements of the optical system 11 are mounted in a housing 24 which is preferably molded in two sections from a suitable plastic, such as Bakelite, the housing having molded integrally therewith the lens seats and the fixed apertures 21 and 22. The two sections of the housing may be secured together by any suitable means such as by the screws 25, whereby the lens elements are automatically correctly positioned relative to each other. While the housing may be fixedly connected to the projector proper, provision may be made for small adjustments of the housing as a whole for more precise alignment and focusing of the optics.

The housing 24 serves not only to mount and correctly position the optical elements therein, but also to keep these elements relatively clean and free of dust. It also serves to mount therein the vibratory mechanism 14. The latter comprises the reed 17 which is fastened at one end by a rivet 26 or equivalent means within a channel 27. The channel is closed along its length by the cover plate 28, the reed 17 being normally held in spaced relation with the base of the channel and the cover plate. This box-like enclosure for the reed in effect air damps the reed to prevent its response to certain mechanical vibrations. Vibration caused by moving parts on the sound projector will tend to drive the reed at its resonant frequency resulting in an objectionable ringing noise in the speaker during projection of the film. This microphonic condition is substantially reduced by the adequate damping of the reed. The free end of the reed 17, which is preferably formed of spring steel, is turned sharply outward, projecting out of the open end of the box-like enclosure as noted in Fig. 1. It is this projecting end which by vibrating occludes varying quantities of the light flux traversing the housing 24. The whole vibratory mechanism 14 is secured to a wall of the housing 24 by the rivet 29 or equivalent means. The other end of this mechanism bears freely upon a biasing screw 30 which is threaded into a wall of the housing 24 and is accessible from without the housing. Manipulation of this screw determines the degree to which the reed projects into the light beam. It is obvious that, while the reed 17 is illustrated in the preferred embodiment of the invention as being positioned between the lenses 19 and 20, it may theoretically be so located as to project into the light beam at any point between the exciter lamp and the film. Practical considerations of available space, housing and protection of the reed, etc. have resulted in the reed being positioned as illustrated in Fig. 1.

The resonant frequency selected for the reed is determined in part by the frequency of the variations in filament brightness and, therefore, by the frequency of the alternating current. It has been found that for a 60-cycle power supply a reed having a natural period of vibration of about 100 cycles per second is preferred. Reeds having natural periods below 80 cycles tend to vibrate at 60 cycles instead of at the 120 cycles desired. Also, reeds having natural frequencies very close to 120 cycles are considerably affected as to phase and amplitude of motion by even slight changes in ambient temperature and line voltage. The use of reeds having too high a natural frequency results in considerable microphonic disturbances arising from vibrations caused by moving parts of the projector.

The electromagnet 15 is located wholly without the housing 24 and is positioned adjacent to the wall of the housing upon which the vibratory mechanism 14 is mounted. The electromagnet comprises a coil element 31 of relatively low resistance and an iron core 32 which is threaded into the coil element whereby its position relative thereto is adjustable longitudinally. The core 32 is provided with a slotted end for the reception of a screwdriver head by which the core may be advanced or retracted relative to the coil to vary the magnetic air gap between the core and the reed. This adjustment affects the amplitude of reed vibration. But not only is it necessary to adjust the amplitude of reed vibration but the phase as well, in order that the amount of light flux intercepted may be so proportional to the filament brightness that the light flux impinging upon the sound track may remain substantially constant. Moreover, the device should be relatively insensitive to small changes in line voltage which would otherwise tend to unbalance the system causing the return of a certain amount of speaker hum. By connecting the coil 31 in series with the exciter lamp and by employing a long core of relatively small diameter to increase magnetic saturation in the core, it is possible to vary the power supply voltage over a reasonable range of values without any objectionable effect upon the balance. Since the light fluctuations of the lamp filament lag the lamp voltage by some definite amount, it is necessary to produce a phase lag in the vibration of the reed corresponding to this. By using an abnormally long core the required phase lag may be obtained. However, by employing a shading-pole device the objectionable length of core may be eliminated. This device may take the form of the copper slug or ring 33 threaded upon the core between the coil and the reed; the phase lag may thus be varied by adjusting the position of the copper ring 33 upon the core 32. The core is preferably formed of iron or some other material having a low magnetic remanence. A further advantage of a series-connected coil over the parallel-connected coil, such as is disclosed in the above-mentioned Hutchison application, lies in the fact that should the exciter lamp 10 burn out the circuit is opened, thus preventing damage to the coil 31 or the projection lamp 38. This is obviously not the case in the parallel-coil arrangement.

The theory underlying the operation of the sound film scanning apparatus and, in particular, the phase relationships involved is fully discussed in the said Hutchison application for U. S. Letters Patent Serial No. 764,399.

The beam of uniform light flux is emitted from the housing 24 through the slot aperture 34 which is aligned with the sound track of the film 16, the latter being guided past the aperture by the sound scanning and stabilizing drum 12. The sound track of the film overlies the edge of the drum 12 as illustrated in Figs. 2 and 3, whereby the beam may traverse the track, and then be directed upon the phototube 13 by the reflector unit 35. The latter is preferably a glass or plastic light-conducting rod having an inclined mirror surface 36 at one end which deflects the modulated beam through the rod toward the phototube. The shaft 37 mounting the drum 12 also preferably mounts a flywheel (not shown) which assists in carrying the film past the aperture 34 at a uniform rate of speed.

It should be understood that the sound film scanning apparatus described herein is equally well adapted for use with films having sound tracks of either the variable density or the variable area types. It is also apparent that the beam of light falling upon the sound track need not be in the form of a thin or narrow band of light. A beam of any cross section, covering the width of the sound track, would perform satisfactorily with a mask, or preferably a cylindrical lens and a mask, interposed between the film and the phototube to cause but a thin transverse band of light of the total beam scanning the sound strip to impinge upon the phototube. The present invention is obviously adapted to insure that a substantially uniform light flux impinge upon the sound track regardless of the cross section of the beam.

From the foregoing description, it will be apparent that I have provided means for obtaining all the objects and advantages of this invention.

What I claim and desire to secure by Letters Patent of the United States is:

1. In a device for use with alternating current adapted to project a beam of light of substantially constant light flux, a lamp, an optical system adapted to project a beam of light from the lamp, a reed capable of being vibrated and projected partially into the light beam to intercept varying amounts of light flux, an electromagnet adjacent to said reed and connected in series with the lamp, the electromagnet being adapted to vibrate said reed in synchronism with the cyclic variations in lamp brightness, and means to adjust the phase of the reed vibrations relative to the variations in lamp brightness, whereby the light flux of the beam emitted by the device remains substantially constant.

2. In a device for use with alternating current adapted to project a beam of light of substantially constant light flux, a lamp, an optical system adapted to project a beam of light from the lamp, a reed capable of being vibrated and projected partially into the light beam to intercept varying amounts of light flux, an electromagnet positioned adjacent to said reed, the electromagnet including a coil connected in series with said lamp and an adjustable core for varying the air gap between the reed and core, the electromagnet being adapted to vibrate said reed in synchronism with the cyclic variations in lamp brightness whereby the light flux of the beam emitted by the device remains substantially constant.

3. In a device for use with alternating current adapted to project a beam of light of substantially constant light flux, a lamp, an optical system adapted to project a beam of light from the lamp, a reed capable of being vibrated and projected partially into the light beam to intercept varying amounts of light flux, an electromagnet adapted to vibrate the reed, the electromagnet including a coil connected in a series with said lamp and a core whose position in the coil is adjustable for varying the air gap between the reed and the core, said core having a shading-pole element adjustably mounted thereon, whereby the reed may be caused to vibrate in such synchronism with the cyclic variations in lamp brightness that the total light flux of the beam emitted by the device remains substantially constant.

4. In a device for use with alternating current adapted to project a beam of light of substantially constant light flux, a lamp, an optical system adapted to project a beam of light from the lamp, a reed capable of being vibrated and projected partially into the light beam to intercept varying amounts of light flux, an electromagnet adapted to vibrate the reed, the electromagnet including a coil connected in series with said lamp and a core threaded into the coil for adjusting the air gap between the reed and the core, said core having a shading-pole element threaded upon the core between the reed and the coil, whereby the reed may be caused to vibrate in such synchronism with the cyclic variations in lamp brightness that the total light flux of the beam emitted by the device remains substantially constant.

5. In a device for use with alternating current adapted to project a beam of light of substantially constant light flux, a lamp, an optical system adapted to project a beam of light from the lamp, a reed capable of being vibrated and projected partially into the light beam to intercept varying amounts of light flux, an electromagnet adapted to vibrate the reed, the electromagnet including a coil connected in series with said lamp and a core threaded into the coil for adjusting the air gap between the reed and the core, said core being of a relatively small diameter to increase magnetic saturation therein and having a phase-controlling element threaded for adjustment thereon between the reed and the coil, whereby the amplitude and phase of reed vibration may be readily adjusted.

6. In a device for use with alternating current adapted to project a beam of light of substantially constant light flux, a lamp, an optical system adapted to project a beam of light from the lamp, an air-damped reed capable of being vibrated and projected partially into the light beam to intercept varying amounts of light flux, means for adjusting the position of the end of the reed relative to the light beam, an electromagnet adapted to vibrate the reed, the electromagnet including a coil connected in series with said lamp and a core threaded into the coil for adjusting the air gap between the reed and the core, said core being of a relatively small diameter to increase magnetic saturation and having a copper ring threaded thereon between the reed and the coil, whereby the reed may be caused to vibrate in such synchronism with the cyclic variations in lamp brightness that the total light flux of the beam emitted by the device remains substantially constant.

7. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam to intercept varying amounts of light flux, an electromagnet adjacent to said reed and connected in series with the exciter lamp, the electromagnet being adapted to vibrate said reed in synchronism with the cyclic variations in lamp brightness, and means on said electromagnet to adjust the phase of the reed vibrations relative to the variations in lamp brightness, whereby the light flux impinging upon the sound track remains substantially constant.

8. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam to intercept varying amounts of light flux, an electromagnet positioned adjacent to said reed, the electromagnet including a coil connected in series with said exciter lamp and an adjustable core for varying the air gap between the reed and core, the electromagnet being adapted to vibrate said reed in synchronism with the cyclic variations in lamp brightness whereby the light flux impinging upon the sound track remains substantially constant.

9. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam to intercept varying amounts of light flux, an electromagnet adapted to vibrate the reed, the electromagnet including a coil connected in series with said exciter lamp and a core whose position in the coil is adjustable for varying the air gap between the reed and the core, said core having a shading-pole device adjustably mounted thereon, whereby the reed may be caused to vibrate in such synchronism with the cyclic variations in lamp brightness that the total light flux impinging upon the sound track remains substantially constant.

10. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam to intercept varying amounts of light flux, an electromagnet adapted to vibrate the reed, the electromagnet including a coil connected in series with said exciter lamp and a core threaded into the coil for adjusting the air gap between the reed and the core, said core having a shading-pole device threaded upon the core between the reed and the coil, whereby the reed may be caused to vibrate in such synchronism with the cyclic variations in lamp brightness that the total light flux impinging upon the sound track remains substantially constant.

11. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, a reed capable of being vibrated and projected partially into the light beam to intercept varying amounts of light flux, an electromagnet adapted to vibrate the reed, the electromagnet including a coil connected in series with said exciter lamp and a core threaded into the coil for adjusting the air gap between the reed and the core, said core being of a relatively small diameter to increase magnetic saturation therein and having a phase-controlling element threaded for adjustment thereon between the reed and the coil, whereby the amplitude and phase of reed vibration may be readily adjusted.

12. In a sound film scanning apparatus adapted for use with alternating current, an exciter lamp, an optical system adapted to project a beam of light upon the sound track of the film, a phototube optically aligned with said lamp and optical system and positioned to receive light which has traversed the sound track, an air-damped reed capable of being vibrated and projected partially into the light beam to intercept varying amounts of light flux, means for adjusting the position of the end of the reed relative to the light beam, an electromagnet adapted to vibrate the reed, the electromagnet including a coil connected in series with said exciter lamp and a core threaded into the coil for adjusting the air gap between the reed and the core, said core being of a relatively small diameter to increase magnetic saturation therein and having a copper ring threaded thereon between the reed and the coil, whereby the reed may be caused to vibrate in such synchronism with the cyclic variations in lamp brightness that the total light flux impinging upon the sound track remains substantially constant.

JOHN A. RODGERS.

REFERENCES CITED

The following references are of record in the file of this patent:

UNITED STATES PATENTS

| Number | Name | Date |
| --- | --- | --- |
| 1,974,900 | Shoup | Sept. 25, 1934 |
| 2,036,447 | Tuttle | Apr. 7, 1936 |
| 2,169,405 | Cooney | Aug. 15, 1939 |
| 2,274,530 | Collins | Feb. 24, 1942 |

FOREIGN PATENTS

| Number | Country | Date |
| --- | --- | --- |
| 367,591 | Great Britain | Feb. 25, 1932 |